United States Patent
Fishburn et al.

(10) Patent No.: US 10,281,031 B2
(45) Date of Patent: May 7, 2019

(54) GEARBOX SHIFT LOCK-OUT DEVICE

(71) Applicant: Parker-Hannifin Corporation, Cleveland, OH (US)

(72) Inventors: Bruce Fishburn, Memphis, TN (US); Bradley Slakans, Collierville, TN (US)

(73) Assignee: Parker-Hannifin Corporation, Cleveland, OH (US)

( * ) Notice: Subject to any disclaimer, the term of this patent is extended or adjusted under 35 U.S.C. 154(b) by 443 days.

(21) Appl. No.: 15/041,918

(22) Filed: Feb. 11, 2016

(65) Prior Publication Data

US 2016/0230885 A1    Aug. 11, 2016

Related U.S. Application Data

(60) Provisional application No. 62/114,905, filed on Feb. 11, 2015.

(51) Int. Cl.
   *F16H 61/02* (2006.01)

(52) U.S. Cl.
   CPC ..... *F16H 61/0276* (2013.01); *F16H 61/0267* (2013.01); *F16H 2061/0279* (2013.01)

(58) Field of Classification Search
   CPC ..... F16K 99/0059; F16K 31/12; F16K 31/122
   See application file for complete search history.

(56) References Cited

U.S. PATENT DOCUMENTS

| | | | | |
|---|---|---|---|---|
| 3,026,892 A | * | 3/1962 | Tsien | F15B 13/0438 137/625.62 |
| 3,283,784 A | * | 11/1966 | Ruchser | F15B 13/0405 137/625.26 |
| 3,491,982 A | * | 1/1970 | Gascoigne | F16K 31/42 251/30.02 |
| 3,691,872 A | * | 9/1972 | Schaefer | F16H 61/0267 192/109 F |
| 3,907,248 A | * | 9/1975 | Coulbeck | F16K 31/122 251/30.02 |
| 4,442,727 A | * | 4/1984 | Young | F16H 61/0206 477/124 |

(Continued)

OTHER PUBLICATIONS

Nonresident Training Course, Construction Mechanic Basic, vol. 2, Navedtra 14273, 1999, pp. 1-2.

*Primary Examiner* — William Kelleher
*Assistant Examiner* — Gregory T Prather
(74) *Attorney, Agent, or Firm* — MacMillan, Sobanski & Todd, LLC (57) ABSTRACT

A shift lock-out device is used with a gearbox containing one or more gears and a clutch mechanism that is operable to selectively engage the one or more gears to provide first and second gear ratios. The shift lock-out device includes a housing having an inlet port that communicates with a source of pressurized fluid and an outlet port that communicates with the clutch mechanism. A valve element is supported within the housing for movement between an opened position, wherein fluid communication is permitted from the inlet port to the outlet port, and a closed position, wherein fluid communication is prevented from the inlet port and an outlet port. A pilot control valve selectively permits and prevents the application of pressurized fluid from a pilot fluid source against the valve element to selectively move the valve element between the opened and closed positions.

17 Claims, 5 Drawing Sheets

(56) References Cited

U.S. PATENT DOCUMENTS

| | | | | |
|---|---|---|---|---|
| 4,476,747 | A | * | 10/1984 | Kawamoto ........... F16H 61/065 477/119 |
| 4,638,720 | A | * | 1/1987 | McKee ............... F16H 61/0206 91/522 |
| 6,131,475 | A | * | 10/2000 | Riedhammer ...... F16H 61/0246 137/625.64 |
| 8,915,480 | B2 | * | 12/2014 | Jakobsen ................ F15B 21/06 251/30.02 |

* cited by examiner

GEARBOX SHIFT LOCK-OUT DEVICE

CROSS-REFERENCE TO RELATED APPLICATIONS

This application claims the benefit of U.S. Provisional Application No. 62/114,905, filed Feb. 11, 2015, the disclosure of which is incorporated herein by reference.

BACKGROUND OF THE INVENTION

This invention relates in general to devices for controlling the shifting of gears within a gearbox. More specifically, this invention relates to an improved structure for a shift lock-out device that selectively enables and disables the occurrence of such gear shifting within a gearbox in response to one or more predetermined operating conditions.

A gearbox is a well known structure that is often provided between a source of rotational energy and a rotatably driven device. In its simplest form, the gearbox selectively provides first and second gear ratios between an input shaft of the gearbox (which is rotatably driven by the source of rotational energy) and an output shaft of the gearbox (which rotatably drives the rotatably driven device). The first gear ratio is provided between the input and output shafts of the gearbox when a first set of gears contained within the gearbox is engaged therebetween, while the second gear ratio is provided between the input and output shafts of the gearbox when a second set of gears contained within the gearbox is engaged therebetween. Typically, a clutch mechanism (such as a conventional axially movable shift collar) is provided within the gearbox for selectively engaging one of the first and second sets of gears for providing the first and second gear ratios.

When the clutch mechanism is actuated to shift from one of the first and second gear ratios to the other, there may be a differential between the rotational speeds of the gears contained in the first and second sets of gears, i.e., one of the gears contained in the first and second sets of gears may be rotating faster or slower than another. Because of this, the rotational speed of the shift collar may differ from the selected gear of the first and second sets of gears to which it is being moved into engagement. It is desirable that this speed differential be minimized to avoid gear grinding or damage to the gears during shifting, particularly when the clutch mechanism is embodied as a conventional shift collar.

Known structures for minimizing this speed differential during shifting include gearbox synchronizers and internal gearbox clutches. Alternatively, an operator may minimize this speed differential manually by carefully controlling the shifting process. However, these known structures and methods may result in wear on friction elements or may require specialized expertise. Thus, it would be desirable to provide an improved device for controlling the shifting of gears within a gearbox that avoids these problems simply and inexpensively.

SUMMARY OF THE INVENTION

This invention relates to an improved structure for a shift lock-out device that selectively enables and disables the occurrence of gear shifting within a gearbox in response to one or more predetermined operating conditions. The shift lock-out device includes a housing having an inlet port that communicates with a source of pressurized fluid and an outlet port that communicates with the clutch mechanism. A valve element is supported within the housing for movement between an opened position, wherein fluid communication is permitted from the inlet port to the outlet port, and a closed position, wherein fluid communication is prevented from the inlet port and an outlet port. A pilot control valve selectively permits and prevents the application of pressurized fluid from a pilot fluid source against the valve element to selectively move the valve element between the opened and closed positions.

Various aspects of this invention will become apparent to those skilled in the art from the following detailed description of the preferred embodiments, when read in light of the accompanying drawings.

DETAILED DESCRIPTION OF THE PREFERRED EMBODIMENTS

Figure 1:
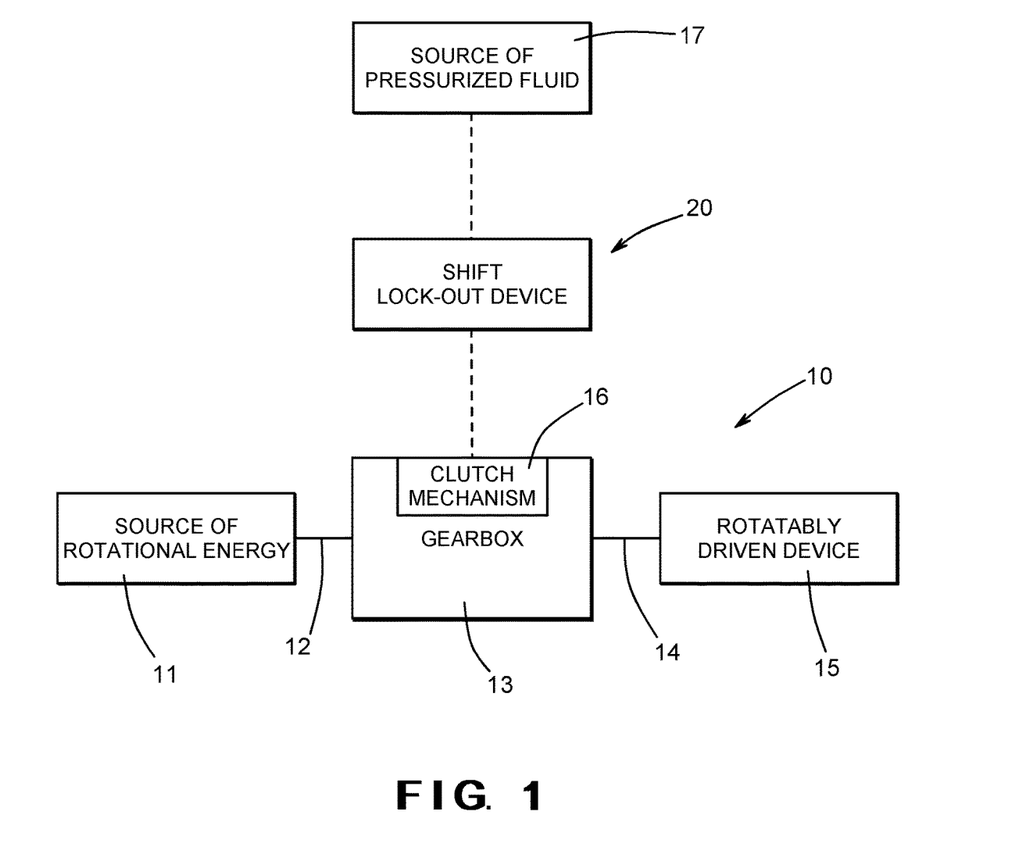
FIG. 1 is a simplified block diagram of a drive train system including a gearbox and a shift lock-out device that selectively enables and disables gear shifting within the gearbox in accordance with this invention.

Referring now to the drawings, there is illustrated in FIG. 1 a simplified block diagram of a drive train system, indicated generally at 10, in accordance with this invention. The illustrated drive train system 10 is, in large measure, conventional in the art and is intended merely to illustrate one environment in which this invention may be used. Thus, the scope of this invention is not intended to be limited for use with the specific structure for the drive train system 10 illustrated in FIG. 1 or with drive train systems in general. On the contrary, as will become apparent below, this invention may be used in any desired environment for the purposes described below.

The illustrated drive train system 10 includes a source of rotational energy 11 that is connected to an input shaft 12 of a gearbox 13. The gearbox 13 also includes an output shaft 14 that is connected to a rotatably driven device 15. The gearbox 13 may be embodied as any well known structure that selectively provides first and second gear ratios between the input shaft 12 (which is driven by the source of rotational energy 11) and the output shaft 14 (which drives the rotatably driven device 15). In a manner that is well known in the art, a first gear ratio may be provided between the input shaft 12 and the output shaft 14 of the gearbox 13 when a first set of gears (not shown) contained within the gearbox 13 is engaged therebetween. Similarly, a second gear ratio may be provided between the input shaft 12 and the output shaft 14 of the gearbox 13 when a second set of gears (not shown) contained within the gearbox 13 is engaged therebetween. The source of rotational energy 11, the gearbox 13, and the rotatably driven device 15 are all conventional in the art.

A clutch mechanism 16 is provided within the gearbox 13 for selectively engaging one of the first and second sets of gears for use. The clutch mechanism 16 may be embodied as a conventional shift collar (not shown) that is axially movable between first and second gear engaging positions. However, the clutch mechanism 16 may be embodied as any other structure that is adapted to selectively engage one of the first and second sets of gears for use. A source of pressurized fluid 17 is provided for selectively operating the clutch mechanism 16 to selectively engage one of the first and second sets of gears for use. The source of pressurized fluid 17 is conventional in the art may be hydraulic (i.e., use a liquid as the force transmitting medium) or pneumatic (i.e., use a gas as the force transmitting medium) as desired. Alternatively, the source of pressurized fluid 17 may be replaced by a conventional electrical or mechanical actuator or any other desired structure.

Figure 2:
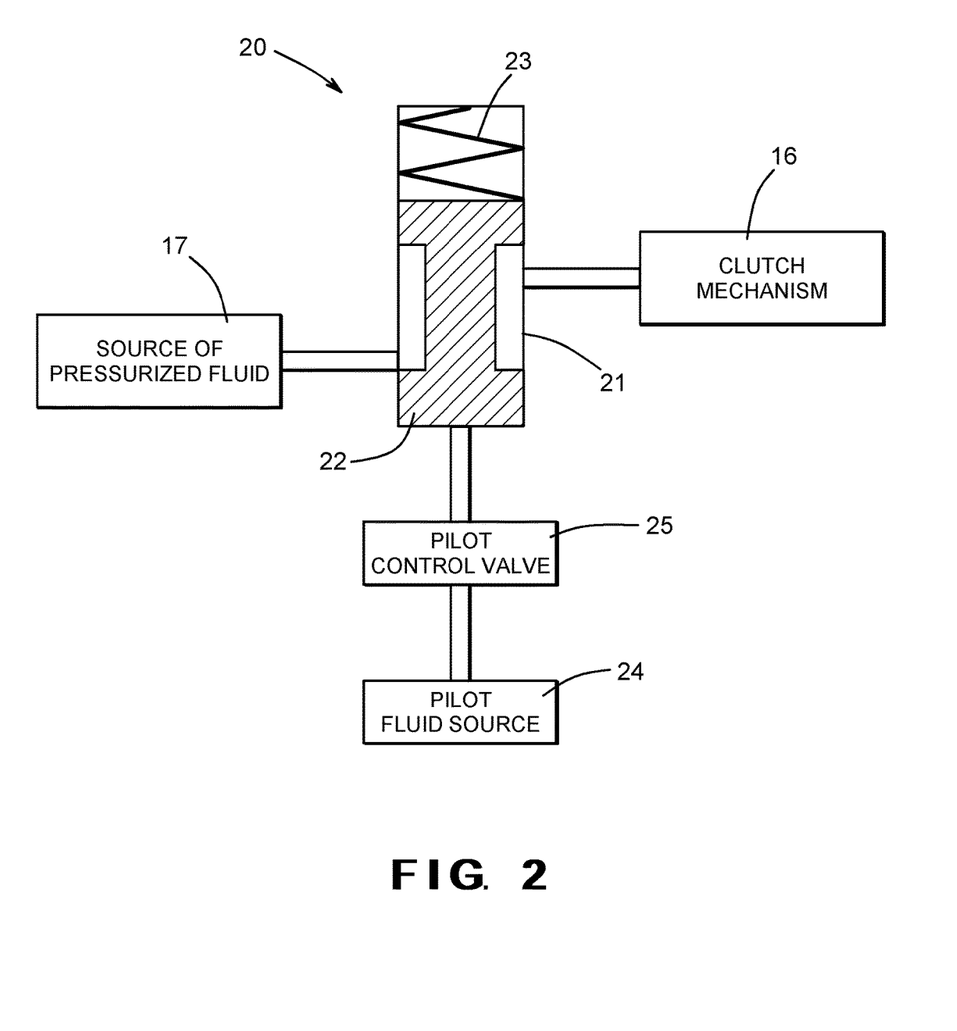
FIG. 2 is a schematic view of a first embodiment of the shift lock-out device illustrated in FIG. 1 shown in an opened position that enables gear shifting to occur within the gearbox.
Figure 3:
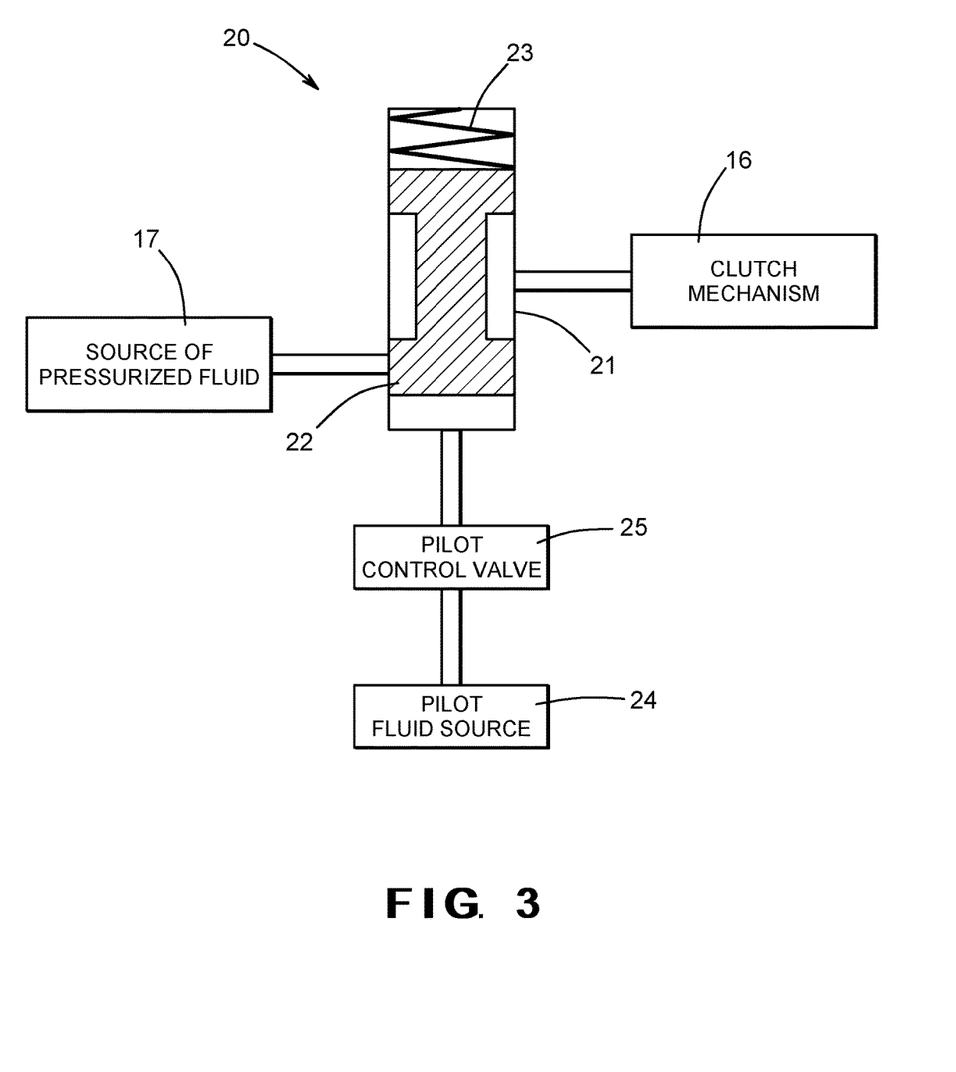
FIG. 3 is a schematic view of the first embodiment of the shift lock-out device illustrated in FIG. 1 shown in a closed position that disables gear shifting from occurring within the gearbox.

In accordance with this invention, a shift lock-out device, indicated generally at 20, is provided for selectively permitting and preventing fluid communication between the source of pressurized fluid 17 and the clutch mechanism 16. When the shift lock-out device 20 is actuated to a first, opened position, fluid communication is permitted between the source of pressurized fluid 17 and the clutch mechanism 16 (as shown in FIG. 2). As a result, the clutch mechanism 16 is enabled to be selectively operated to engage one of the first and second sets of gears for use. Conversely, when the shift lock-out device 20 is actuated to a second, closed position, fluid communication is prevented between the source of pressurized fluid 17 and the clutch mechanism 16 (as shown in FIG. 3). As a result, the clutch mechanism 16 is disabled from being selectively operated to engage one of the first and second sets of gears for use.

FIGS. 2 and 3 are schematic views of a first embodiment of the shift lock-out device 20 illustrated in FIG. 1. The illustrated shift lock-out device 20 includes a housing 21 including an inlet port and an outlet port. The inlet port of the housing 21 of the shift lock-out device 20 communicates with the source of pressurized fluid 17, and the outlet port of the housing 21 of the shift lock-out device 20 communicates with the clutch mechanism 16. Within the housing 21 of the shift lock-out device 20, a valve element 22 is slidably supported for movement between an opened position (illustrated in FIG. 2) and a closed position (illustrated in FIG. 3). When the valve element 22 is disposed in the opened position illustrated in FIG. 2, fluid communication is permitted from the source of pressurized fluid 17 through the valve element 22 to the clutch mechanism 16. As a result, the clutch mechanism 16 is enabled to selectively engage one of the first and second sets of gears for use. When the valve element 22 is disposed in the closed position illustrated in FIG. 3, fluid communication is prevented from the source of pressurized fluid 17 through the valve element 22 to the clutch mechanism 16. As a result, the clutch mechanism 16 is disabled to selectively engage one of the first and second sets of gears for use.

A biasing structure 23 may be provided for urging the valve element 22 toward either one of the opened and closed positions. In the illustrated embodiment, the biasing structure 23 is a mechanical spring that is supported within the housing 21 of the shift lock-out device 20 and engages a first end of the valve element. However, the biasing structure 23 may be embodied as any desired structure or combination of structures for performing this function. In the illustrated embodiment, the biasing structure 23 urges the valve element 22 toward the opened position illustrated in FIG. 2. However, as suggested above, the biasing structure 23 may alternatively urge the valve element 22 toward the closed position illustrated in FIG. 3. Alternatively, the biasing structure 23 may be omitted if desired.

A control apparatus is provided for selectively moving the valve element 22 between the opened and closed positions against the urging of the biasing structure 23. In the illustrated embodiment, the control apparatus includes a pilot fluid source 24 and a pilot control valve 25. The pilot fluid source 24 is conventional in the art may be embodied as any conventional hydraulic (i.e., using a liquid as the force transmitting medium) or pneumatic (i.e., using a gas as the force transmitting medium) source of fluid pressure. The pilot control valve 25 is conventional in the art may be embodied as a valve or other structure that selectively permits and prevents the application of pressurized fluid from the pilot fluid source 24 against a second end of the valve element 22 that is opposite from the first end.

The illustrated shift lock-out device 20 is a normally open valve, i.e., a valve that normally permits fluid communication between the source of pressurized fluid 17 and the clutch mechanism 16, as shown in FIG. 2. This is because the biasing structure 23 urges the valve element 22 toward the opened position illustrated in FIG. 2, as described above. However, under certain circumstances that will be discussed below, the pilot control valve 25 of the control apparatus is opened, thereby permitting the application of pressurized fluid from the pilot fluid source 24 against the second end of the valve element 22 that is opposite from the first end. As a result, the valve element 22 is moved against the urging of the biasing structure 23 toward the closed position illustrated in FIG. 3, as also described above. When those certain circumstances cease to be present, then the pilot control valve 25 of the control apparatus is closed, thereby preventing the application of pressurized fluid from the pilot fluid source 24 against the second end of the valve element 22 that is opposite from the first end. Consequently, the valve element 22 is moved under the urging of the biasing structure 23 back toward the opened position illustrated in FIG. 2.

The operation of the shift lock-out device 20 can be controlled in any desired manner. For example, as discussed above, it is desirable that the clutch mechanism 16 be actuated to shift from one of the first and second gear ratios to the other only when the differential between the rotational speeds of the gears contained in the first and/or second sets of gears is relatively small. To accomplish this, one or more speed sensors (not shown) or other devices may be provided within the clutch mechanism 16 (or elsewhere in the drive train system 10). Such speed sensors or other devices can generate one or more signals that represent the rotational speeds of one or more of the gears contained in the first and/or second sets of gears. These rotational speed signals may be compared to one another, or alternatively compared to a reference value, in order to determine if the conditions are appropriate for enabling the clutch mechanism 16 to be actuated to shift from one of the first and second gear ratios to the other. For example, the clutch mechanism 16 may be enabled if the differential between the rotational speeds of the gears contained in the first and/or second sets of gears is less than a predetermined amount. Alternatively, the clutch mechanism 16 may be enabled if the rotational speeds of one of the gears contained in the first and/or second sets of gears is less than a predetermined amount.

Regardless of the criteria used to make such determination, when that determination is made, the pilot control valve 25 of the control apparatus is closed, thereby preventing the application of pressurized fluid from the pilot fluid source 24 against the second end of the valve element 22 that is opposite from the first end. Consequently, the valve element 22 is moved under the urging of the biasing structure 23 toward the opened position illustrated in FIG. 2. When that determination is no longer made, the pilot control valve 25 of the control apparatus is opened, thereby permitting the application of pressurized fluid from the pilot fluid source 24 against the second end of the valve element 22 that is opposite from the first end. As a result, the valve element 22 is moved against the urging of the biasing structure 23 toward the closed position illustrated in FIG. 3.

As yet another alternative embodiment of this invention, the pilot fluid source 24 may be embodied as a fluid pump that is driven whenever one of the gears contained in the first and/or second sets of gears is rotated. The amount of fluid pressure that is generated by the fluid pump can be correlated to the rotational speed of the one of the gears contained in the first and/or second sets of gears to which it is connected. In other words, the amount of fluid pressure that is generated by the fluid pump is increased as the rotational speed of that gear is increased, and the amount of fluid pressure that is generated by the fluid pump is decreased as the rotational speed of that gear is decreased. With reference to the first embodiment of the shift lock-out device 20 illustrated in FIGS. 2 and 3, when the rotational speed of that gear is increased above a predetermined threshold, the fluid pump is operated to generate a sufficient amount of fluid pressure to move the valve element 22 toward the closed position illustrated in FIG. 3 against the urging of the biasing element 23. As discussed above, this prevents fluid communication between the source of pressurized fluid 17 and the clutch mechanism 16 (as shown in FIG. 3) and, therefore, disables the clutch mechanism 16 from being selectively operated to engage one of the first and second sets of gears for use. Conversely, when the rotational speed of that gear is decreased below the predetermined threshold, the fluid pump does not generate a sufficient amount of fluid pressure to move the valve element 22 toward the closed position illustrated in FIG. 3 against the urging of the biasing element 23. Thus, the valve element 22 is returned to the opened position, permitting fluid communication between the source of pressurized fluid 17 and the clutch mechanism 16 (as shown in FIG. 3) and, therefore, enabling the clutch mechanism 16 to selectively operated to engage one of the first and second sets of gears for use. In this alternative embodiment of this invention, the pilot control valve 25 of the control apparatus may be omitted.

Figure 4:
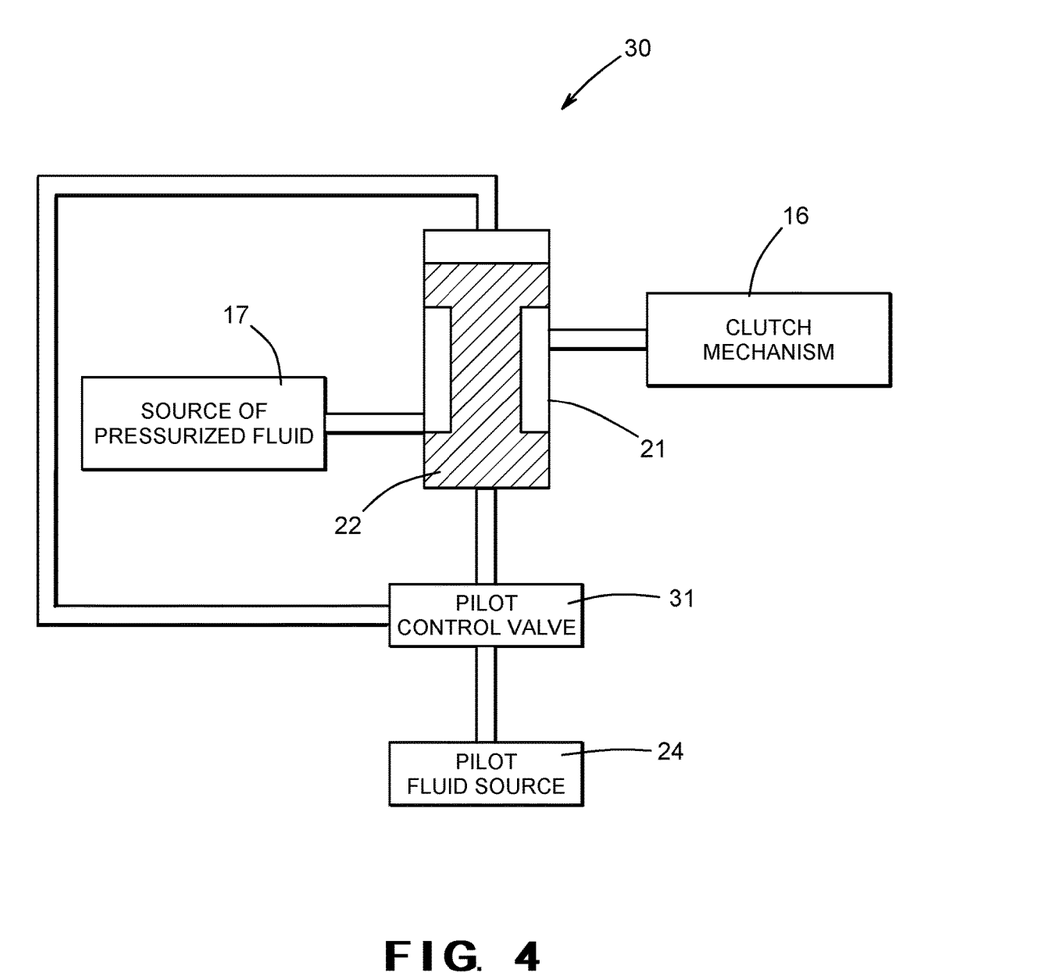
FIG. 4 is a schematic view of a second embodiment of the shift lock-out device illustrated in FIG. 1 shown in an opened position.

FIG. 4 is a schematic view of a second embodiment of a shift lock-out device, indicated generally at 30, in accordance with this invention. The second embodiment of the shift lock-out device 30 is similar to the first embodiment of the shift lock-out device 20 described above, and like reference numbers are used to indicate similar components. In this second embodiment of the shift lock-out device 30, however, the biasing element 23 has been eliminated, and a modified pilot control valve 31 is provided. The modified pilot control valve 31 is conventional in the art may be embodied as a valve or other structure that selectively permits and prevents the application of pressurized fluid from the pilot fluid source 24 against either the first end or the second end of the valve element 22. In a manner similar to that described above, the modified pilot control valve 31 can be operated to selectively position the valve element 22 in either the opened position (illustrated in FIG. 2) or the closed position (illustrated in FIG. 3).

Figure 5:
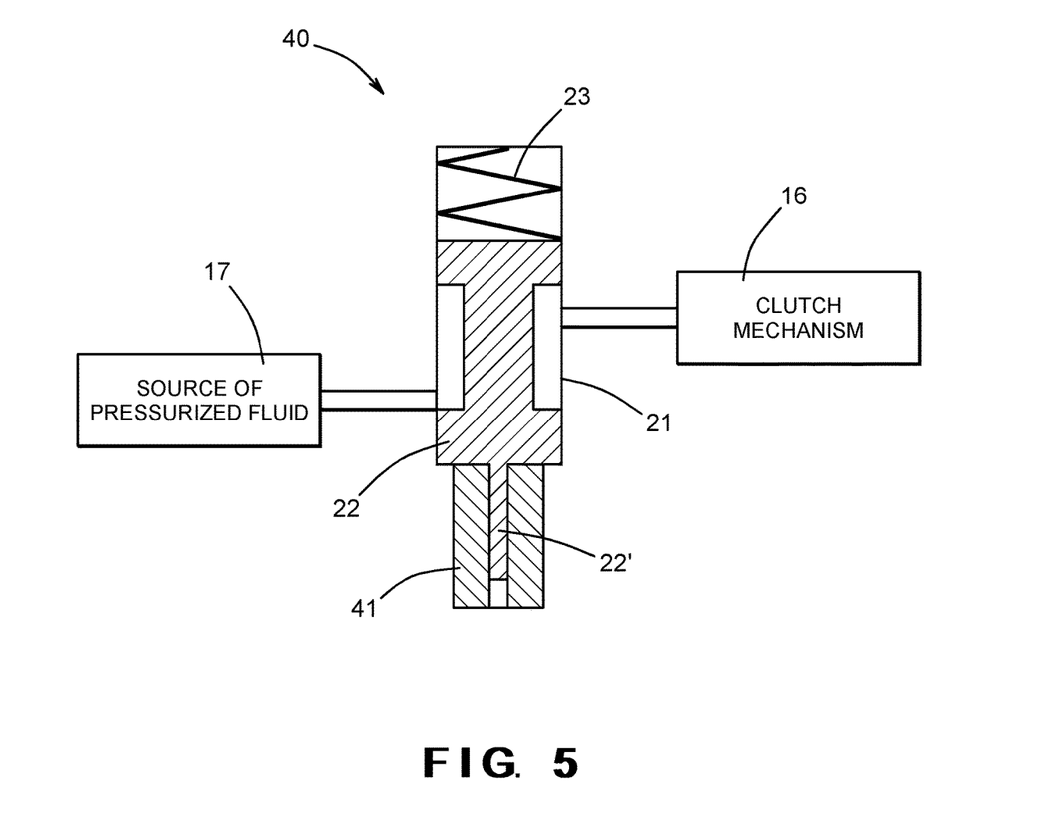
FIG. 5 is a schematic view of a third embodiment of the shift lock-out device illustrated in FIG. 1 shown in an opened position.

FIG. 5 is a schematic view of a third embodiment of the shift lock-out device, indicated generally at 40, in accordance with this invention. The third embodiment of the shift lock-out device 40 is also similar to the first embodiment of the shift lock-out device 20 described above, and like reference numbers are used to indicate similar components. In this third embodiment of the shift lock-out device 30, however, the pilot fluid source 24 and the pilot control valve 25 have been eliminated, and a solenoid actuator 41 is provided. The solenoid actuator 41 is conventional in the art may be embodied as any conventional electromagnetic or other structure that can selectively position the valve element 22 in either the opened position (illustrated in FIG. 2) or the closed position (illustrated in FIG. 3). To facilitate this, the valve element 22 may include a stem portion 22' that extends within a portion of the solenoid actuator 41, as shown in FIG. 5. A controller (not shown) may be responsive to the one or more speed sensors or other devices for operating the solenoid actuator 41 to selectively position the valve element 22 in either the opened position (illustrated in FIG. 2) or the closed position (illustrated in FIG. 3).

The principle and mode of operation of this invention have been explained and illustrated in its preferred embodiments. However, it must be understood that this invention may be practiced otherwise than as specifically explained and illustrated without departing from its spirit or scope.

What is claimed is:

1. A shift lock-out device adapted for use with a gearbox containing one or more gears and a clutch mechanism that is operable to selectively engage the one or more gears to provide first and second gear ratios, the shift lock-out device comprising:
   a housing including an inlet port adapted to communicate with a source of pressurized fluid and an outlet port adapted to communicate with the clutch mechanism;
   a valve element supported within the housing for movement between an opened position, wherein fluid communication is permitted from the inlet port to the outlet port, and a closed position, wherein fluid communication is prevented from the inlet port and an outlet port;
   a pilot fluid source; and
   a pilot control valve that selectively permits and prevents the application of pressurized fluid from the pilot fluid source against both a first end of the valve element and a second end of the valve element that is opposite to the first end to selectively move the valve element between the opened and closed positions.

2. An assembly comprising:
   a gearbox containing one or more gears and a clutch mechanism that is operable to selectively engage the one or more gears to provide first and second gear ratios; and
   a shift lock-out device including:
      a housing including an inlet port adapted to communicate with a source of pressurized fluid and an outlet port that communicates with the clutch mechanism;
      a valve element supported within the housing for movement between an opened position, wherein fluid communication is permitted from the inlet port to the outlet port, and a closed position, wherein fluid communication is prevented from the inlet port and an outlet port;
      a pilot fluid source; and
      a pilot control valve that selectively permits and prevents the application of pressurized fluid from the pilot fluid source against both a first end of the valve element and a second end of the valve element that is opposite to the first end to selectively move the valve element between the opened and closed positions.

3. The shift lock-out device defined in claim 2 wherein the clutch mechanism is enabled to operate to selectively engage the one or more gears to provide first and second gear ratios when the valve element is in the opened position, and wherein the clutch mechanism is disabled to operate to selectively engage the one or more gears to provide first and second gear ratios when the valve element is in the closed position.

4. The shift lock-out device defined in claim 2 wherein the valve element is moved between the opened and closed positions in response to a rotational speed of the one or more gears contained in the gearbox.

5. The shift lock-out device defined in claim 2 wherein the valve element is moved between the opened and closed positions when a rotational speed of the one or more gears contained in the gearbox is less than a predetermined amount.

6. The shift lock-out device defined in claim 2 wherein the valve element is moved from the closed position to the opened position when a rotational speed of the one or more gears contained in the gearbox is less than a predetermined amount.

7. The shift lock-out device defined in claim 2 wherein the valve element is moved between the opened and closed positions in response to a rotational speed differential of the one or more gears contained in the gearbox.

8. The shift lock-out device defined in claim 2 wherein the valve element is moved between the opened and closed positions when a rotational speed differential of the one or more gears contained in the gearbox is less than a predetermined amount.

9. The shift lock-out device defined in claim 2 wherein the valve element is moved from the closed position to the opened position when a rotational speed differential of the one or more gears contained in the gearbox is less than a predetermined amount.

10. An assembly comprising:
   a source of pressurized fluid;
   a gearbox containing one or more gears and a clutch mechanism that is operable to selectively engage the one or more gears to provide first and second gear ratios; and
   a shift lock-out device including:
      a housing including an inlet port that communicates with the source of pressurized fluid and an outlet port that communicates with the clutch mechanism;
      a valve element supported within the housing for movement between an opened position, wherein fluid communication is permitted from the inlet port to the outlet port, and a closed position, wherein fluid communication is prevented from the inlet port and an outlet port;
      a pilot fluid source; and
      a pilot control valve that selectively permits and prevents the application of pressurized fluid from the pilot fluid source against both a first end of the valve element and a second end of the valve element that is opposite to the first end to selectively move the valve element between the opened and closed positions.

11. The shift lock-out device defined in claim 10 wherein the clutch mechanism is enabled to operate to selectively engage the one or more gears to provide first and second gear ratios when the valve element is in the opened position, and wherein the clutch mechanism is disabled to operate to selectively engage the one or more gears to provide first and second gear ratios when the valve element is in the closed position.

12. The shift lock-out device defined in claim 10 wherein the valve element is moved between the opened and closed positions in response to a rotational speed of the one or more gears contained in the gearbox.

13. The shift lock-out device defined in claim 10 wherein the valve element is moved between the opened and closed positions when a rotational speed of the one or more gears contained in the gearbox is less than a predetermined amount.

14. The shift lock-out device defined in claim 10 wherein the valve element is moved from the closed position to the opened position when a rotational speed of the one or more gears contained in the gearbox is less than a predetermined amount.

15. The shift lock-out device defined in claim 10 wherein the valve element is moved between the opened and closed positions in response to a rotational speed differential of the one or more gears contained in the gearbox.

16. The shift lock-out device defined in claim 10 wherein the valve element is moved between the opened and closed positions when a rotational speed differential of the one or more gears contained in the gearbox is less than a predetermined amount.

17. The shift lock-out device defined in claim 10 wherein the valve element is moved from the closed position to the opened position when a rotational speed differential of the one or more gears contained in the gearbox is less than a predetermined amount.

* * * * *